US010127106B2

(12) United States Patent
Tsao et al.

(10) Patent No.: US 10,127,106 B2
(45) Date of Patent: Nov. 13, 2018

(54) REDUNDANT DISK ARRAY SYSTEM AND DATA STORAGE METHOD THEREOF

(71) Applicant: AccelStor, Ltd., Taipei (TW)

(72) Inventors: Shih-Chiang Tsao, Taipei (TW); Ting-Fang Chien, Taipei (TW); An-Nan Chang, Taipei (TW)

(73) Assignee: ACCELSTOR LTD., Taipei (TW)

( * ) Notice: Subject to any disclaimer, the term of this patent is extended or adjusted under 35 U.S.C. 154(b) by 126 days.

(21) Appl. No.: 15/204,442

(22) Filed: Jul. 7, 2016

(65) Prior Publication Data
US 2017/0357547 A1 Dec. 14, 2017

(30) Foreign Application Priority Data
Jun. 8, 2016 (CN) .......................... 2016 1 0402648

(51) Int. Cl.
*G06F 11/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC .. G06F 11/1076; G06F 3/0689; G06F 3/0619; G06F 3/064
USPC ......................................................... 714/6.24
See application file for complete search history.

(56) References Cited

U.S. PATENT DOCUMENTS

| 2012/0284587 | A1* | 11/2012 | Yu ......................... | G06F 3/0608 714/773 |
| 2012/0311193 | A1* | 12/2012 | Erdmann ............... | G11C 16/06 710/5 |
| 2016/0179398 | A1* | 6/2016 | Ioannou ................ | G06F 3/0608 711/103 |
| 2016/0179410 | A1* | 6/2016 | Haas ..................... | G06F 3/0619 714/6.24 |
| 2016/0179422 | A1* | 6/2016 | Lee ........................ | G06F 11/10 711/103 |
| 2016/0188410 | A1* | 6/2016 | Lee ..................... | G06F 11/1044 714/6.24 |

OTHER PUBLICATIONS

Wikipedia "RAID" page, retrieved from https://en.wikipedia.org/wiki/RAID (Year: 2018).*

* cited by examiner

*Primary Examiner* — Yair Leibovich
(74) *Attorney, Agent, or Firm* — Birch, Stewart, Kolasch & Birch, LLP

(57) ABSTRACT

A redundant disk array system and a data storage method thereof are provided. The redundant disk array system includes a plurality of disks, a plurality of data stripes, and a processing unit. The processing unit stores, in a log manner into a write page, first logic page numbers corresponding to the pieces of write data, and records write locations of the first logic page numbers; the processing unit performs garbage collection on invalid page numbers of the first logic page numbers; and after executing garbage collection, the processing unit writes, in a log manner, second logic page numbers corresponding to the pieces of write data into the write pages traversed by a data stripe of the data stripes that has the most invalid page numbers, and records write locations of the second logic page numbers.

10 Claims, 8 Drawing Sheets

REDUNDANT DISK ARRAY SYSTEM AND DATA STORAGE METHOD THEREOF

CROSS-REFERENCES TO RELATED APPLICATIONS

This non-provisional application claims priority under 35 U.S.C. § 119(a) on Patent Application No. 201610402648.0 filed in China, P.R.C. on Jun. 6, 2018, the entire contents of which are hereby incorporated by reference.

BACKGROUND

Technical Field

The present invention relates to a storage apparatus, and more particularly, to a redundant disk array system and a data storage method thereof.

Related Art

A redundant array of independent disks (RAID) is to design many independent small-capacity disks into a large-capacity disk. To store data, the data is divided into multiple segments (that is, striping) and are separately stored into the disks. To read the data, the data is read from the disks, to improve the throughput of the overall disk. Moreover, the RAID has an error tolerance function. By means of a parity-check technology, for example, calculation of a parity bit of data, when an error occurs in any disk of the RAID, the original data can be restored.

However, in a conventional RAID technology, a corresponding relationship between each stripe and an address of a page of a disk is fixed and invariable, after data is written to a designated page of a disk, a parity bit corresponding to data in a stripe is also updated accordingly. Therefore, in a process of calculating the parity bit, extra data read and write take place to cause a problem of write amplification. Moreover, if the data is stored into the page of the disk by using a log manner, a mapping relationship between a logical address and an address of the page of the disk requires to be recorded, and a quite substantial memory capacity is needed to record this mapping relationship. For example, if the size of a page of a disk is 4 K, and it is assumed that an overall storage capacity of an RAID is 1 PB, a needed memory capacity is approximately 2,000 GB.

SUMMARY

In view of this, the present invention proposes a redundant disk array system and a data storage method thereof.

In an embodiment, a redundant disk array system includes a plurality of disks, a plurality of data stripes, and a processing unit. Each disk includes multiple pages. Each data stripe traverses multiple write pages of the pages of each disk. The write pages are used to store multiple pieces of write data and a parity bit corresponding to the pieces of write data. Each piece of write data corresponds to a first logic page number. The processing unit is configured to write the first logic page numbers into the write pages sequentially and continuously according to a sequence of the write pages in each data stripe, and the processing unit records a write location of each first logic page number to calculate the parity bit in the foregoing. Moreover, the first logic page numbers include at least one invalid page number, and the processing unit performs garbage collection on the invalid page number. After the processing unit executes garbage collection, the processing unit writes a plurality of second logic page numbers sequentially and continuously into the write pages traversed by a data stripe of the data stripes that has the most invalid page numbers, and the processing unit records a write location of each second logic page number to calculate the parity bit.

In an embodiment, the processing unit in the foregoing writes the first logic page numbers and the second logic page numbers into the write pages of a designated disk of the disks traversed by the data stripes.

In an embodiment, the processing unit in the foregoing writes the first logic page numbers and the second logic page numbers into the write pages of any disk of the disks traversed by the data stripes.

In an embodiment, each disk in the foregoing corresponds to a first index value represented by a plurality of bits, a quantity of the bits corresponds to a quantity of the disks, each first logic page number and each second logic page number correspond to a second index value respectively, and the processing unit records corresponding relationships between the first index values of the disks storing the first logic page numbers and the second index values, and records corresponding relationships between the first index values of the disks storing the second logic page numbers and the second index values.

In an embodiment, a logic page number of the first logic page numbers in the foregoing is stored into a first write page of the write pages at a first time point, and the processing unit writes the logic page number into a second write page of the write pages at a second time point, so that a state of the first write page is updated from being valid to being invalid, where the first write page and the second write page are located in different disks.

In an embodiment, a data storage method is applicable to the redundant disk array in the foregoing, the data storage method including: establishing the plurality of data stripes in the foregoing; writing, according to a sequence of the write pages in the foregoing in each data stripe, first logic page numbers into the write pages sequentially and continuously; recording a write location of each first logic page number to calculate the parity bit in the foregoing; performing garbage collection on at least one invalid page number in the foregoing; writing a plurality of second logic page numbers sequentially and continuously into the write pages traversed by a data stripe of the data stripes that has the most invalid page numbers; and recording a write location of each second logic page number to calculate the parity bit.

In an embodiment, the step of writing first logic page numbers in the foregoing into the write pages sequentially and continuously and the step of writing second logic page numbers sequentially and continuously into the data stripes are: writing the first logic page numbers and the second logic page numbers into the write pages of a designated disk of the disks traversed by the data stripes.

In an embodiment, the step of storing first logic page numbers in the foregoing into the write pages sequentially and continuously and the step of writing second logic page numbers sequentially and continuously into the data stripes are: writing the first logic page numbers and the second logic page numbers into the write pages of any disk of the disks traversed by the data stripes.

In an embodiment, the step of writing the first logic page numbers and the second logic page numbers in the foregoing into any disk of the disks traversed by the data stripes includes: establishing a first index value of each disk, where the first index value is represented by a plurality of bits, and a quantity of the bits corresponds to a quantity of the disks;

establishing a second index value of each first logic page number; establishing a second index value of each second logic page number; recording corresponding relationships between the first index values of the disks storing the first logic page numbers and the second index values; and recording corresponding relationships between the first index values of the disks storing the second logic page numbers and the second index values.

In an embodiment, the step of storing first logic page numbers in the foregoing into the write pages sequentially and continuously includes: writing a logic page number of the first logic page numbers into a first write page of the write pages at a first time point; recording that a state of the first write page is valid; storing the logic page number in a second write page of the write pages at a second time point, where the second write page and the first write page are located in different disks; and updating the state of the first write page to being invalid.

In conclusion, according to an embodiment of the redundant disk array system of the present invention, a logic page number may be stored into any data stripe, and a data stripe having the largest quantity of invalid page numbers may be preferentially selected to store the logic page number; moreover, a corresponding relationship between the logic page number and a disk storage location of the logic page number is further stored by recording an index value; in this way, not only use efficiency of blank write pages traversed by a data stripe is improved, but also a memory capacity needed in the use of a log manner is significantly reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
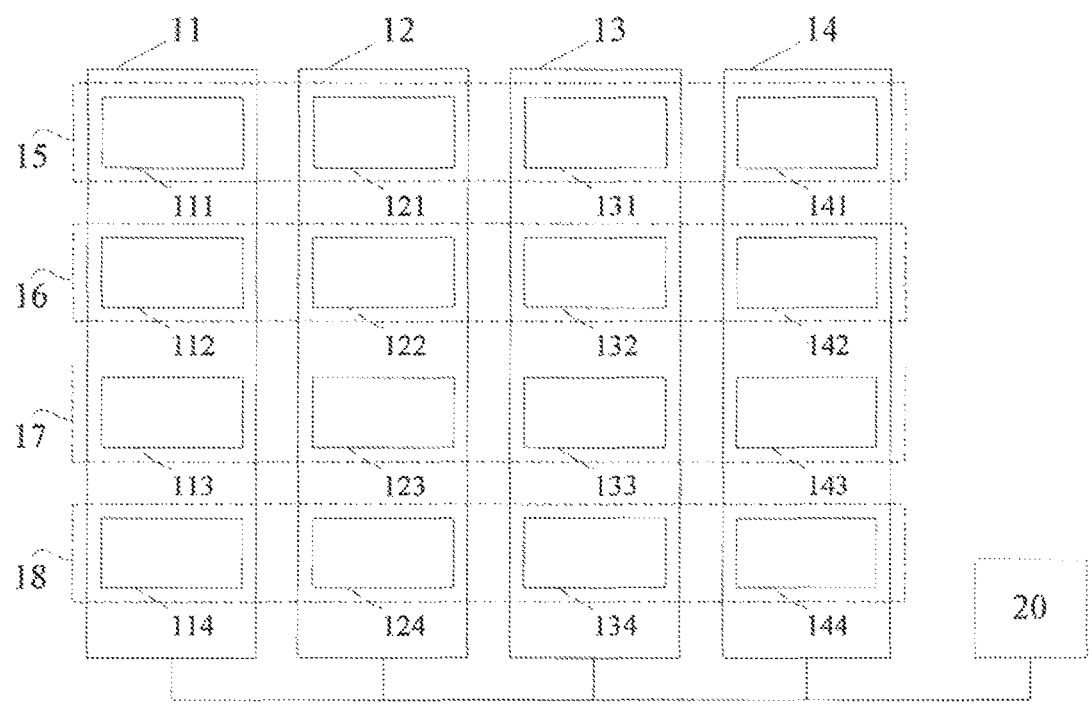
FIG. 1 is a schematic block diagram of an embodiment of a redundant disk array system according to the present invention.
Figure 2:
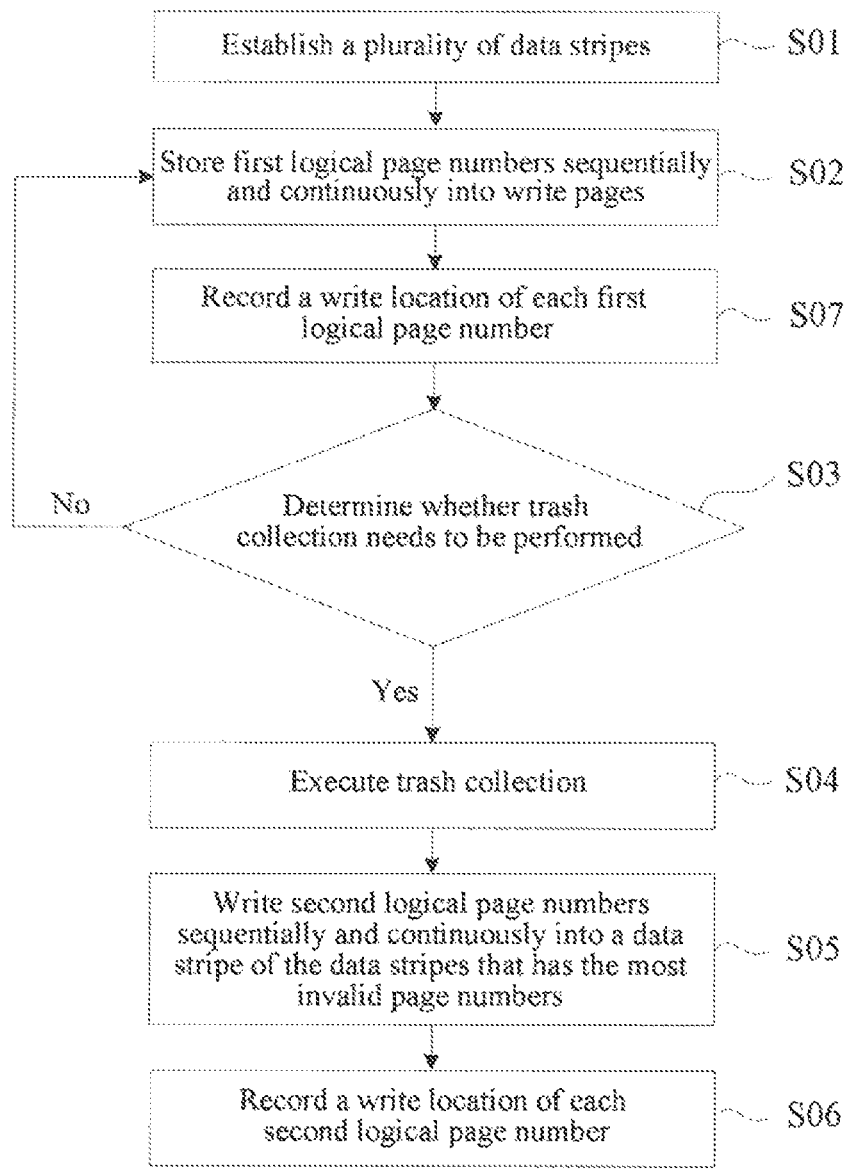
FIG. 2 is a flowchart of an embodiment of a data storage method according to the present invention.

FIG. 1 is a schematic block diagram of an embodiment of a redundant disk array system according to the present invention. FIG. 2 is a flowchart of an embodiment of a data storage method according to the present invention. Referring to both FIG. 1 and FIG. 2, as shown in FIG. 1, the redundant disk array system includes a plurality of disks 11 to 14, a plurality of data stripes 15 to 18, and a processing unit 20. The processing unit 20 is electrically connected to the disks 11 to 14. The redundant disk array system shown in FIG. 1 includes the four disks 11 to 14 and the four data stripes 15 to 18; however, the present invention is not limited thereto. A quantity of disks and a quantity of stripes may be increased or reduced according to a circuit design requirement.

The disks 11 to 14 include multiple pages, the data stripes 15 to 18 traverse the pages of the four disks 11 to 14, and the pages traversed by the data stripes 15 to 18 are referred to as write pages. As shown in FIG. 1, for example, the data stripes 15 to 18 traverse a page in each disk. The data stripes 15 to 18 traverse the four disks 11 to 14 to traverse four write pages, that is, the pages traversed by the data stripe 15 are write pages 111, 121, 131, and 141, the pages traversed by the data stripe 16 are write pages 112, 122, 132, and 142, the pages, traversed by the data stripe 17, of the disks 11 to 14 are write pages 113, 123, 133, and 143, and the pages, traversed by the data stripe 18, of the disks 11 to 14 are write pages 114, 124, 134, and 144.

The write pages 111 to 114, 121 to 124, 131 to 134, and 141 to 144 are used to store multiple pieces of write data and corresponding parity bits. In other words, the processing unit 20 may receive multiple pieces of data from an output/input apparatus, and divide each piece of data into multiple pieces of write data and then store the multiple pieces of write data into the write pages 111 to 114, 121 to 124, 131 to 134, and 141 to 144, to establish the data stripes 15 to 18 (Step S01). Moreover, the processing unit 20 further stores the parity bits corresponding to the multiple pieces of write data into the write pages 111 to 114, 121 to 124, 131 to 134, and 141 to 144. Here, when one disk of the disks 11 to 14 fails, another disk that does not fail may restore, by means of error-correcting code (ECC) check of the parity bit, the pieces of write data stored in the disk that fails. For example, a RAID level 4 is applied and the disk 14 is parity bit disk below. However, the present invention is not limited thereto. The disks 11 to 14 may also be applied to RAID level 5 or even RAID level 6 or above.

The write pages 111 to 114, 121 to 124, 131 to 134, and 141 to 144 may also be used to store first logic page numbers corresponding to the multiple pieces of write data, and the processing unit 20 stores, according to a sequence of the write pages in each data stripe, the first logic page numbers sequentially and continuously into the write pages 111 to 114, 121 to 124, 131 to 134, and 141 to 144 (Step S02). In other words, after the processing unit 20 chooses a data stripe, for example, the data stripe 16, the processing unit 20 stores the first logic page numbers according to a high-low sequence of addresses of the write pages 112, 122, 132, 142 traversed by the data stripe 16. The processing unit 20 stores a first logic page number, received first, into a write page with a high address, and stores a first logic page number, received later, into a write page with a low address, and another write page is not included between the two write pages where the processing unit 20 successively stores the first logic page numbers. Alternatively, in some other implementation aspects, the processing unit 20 stores a first logic page number, received first, into a write page with a low address, and stores a first logic page number, received later, into a write page with a high address.

Figure 3:
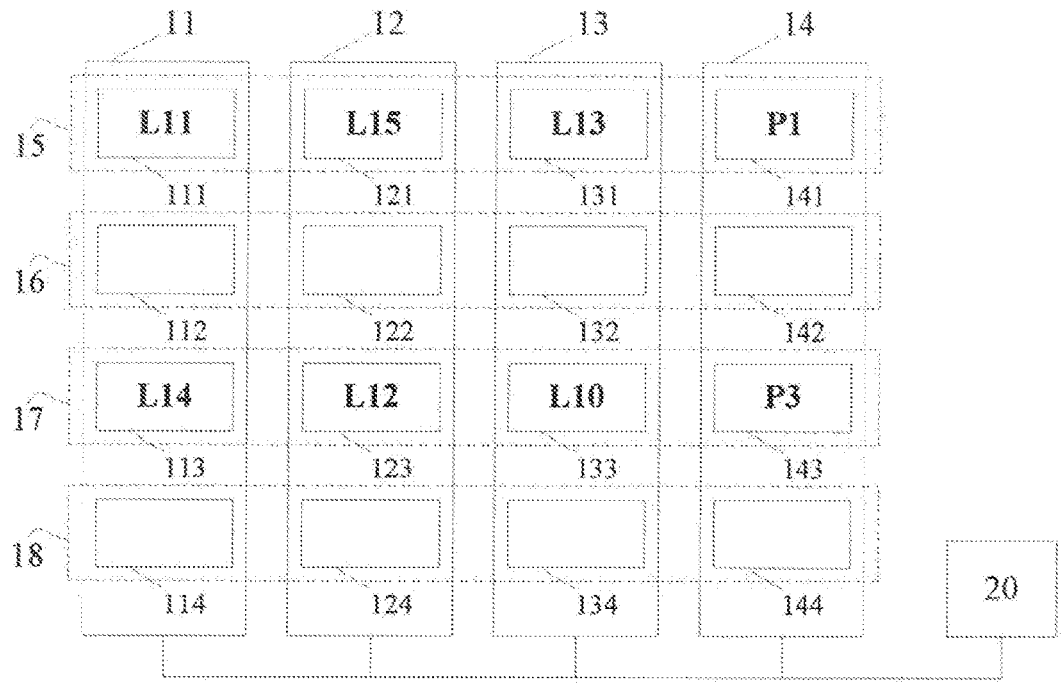
FIG. 3 is a schematic block diagram of first logic page numbers of a first embodiment of the redundant disk array system in FIG. 1 being stored in data stripes 15 and 17.
Figure 4:
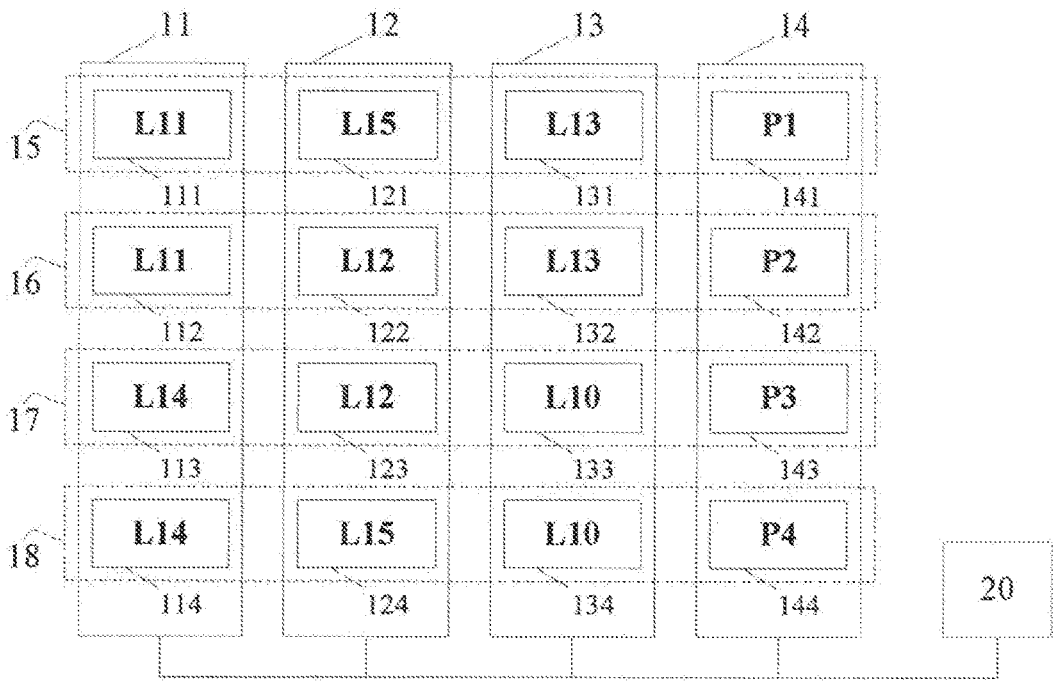
FIG. 4 is a schematic block diagram of the first logic page numbers of the first embodiment of the redundant disk array system in FIG. 1 being stored in data stripes 15 to 18.
Figure 5:
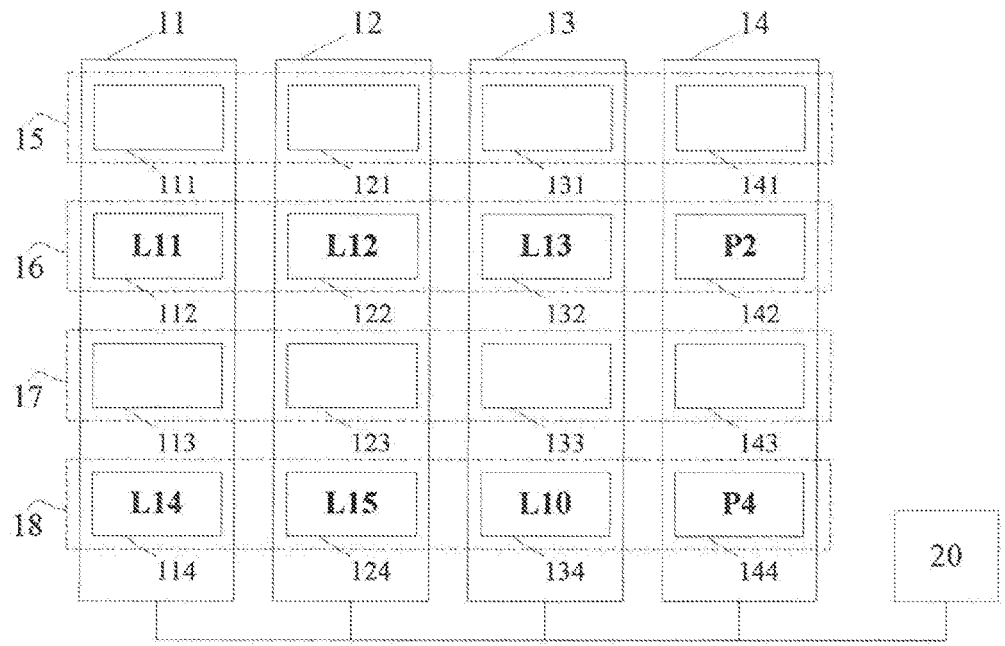
FIG. 5 is a schematic block diagram of the first logic page numbers of the first embodiment of the redundant disk array system in FIG. 1 being stored in the data stripes 16 and 18.
Figure 6:
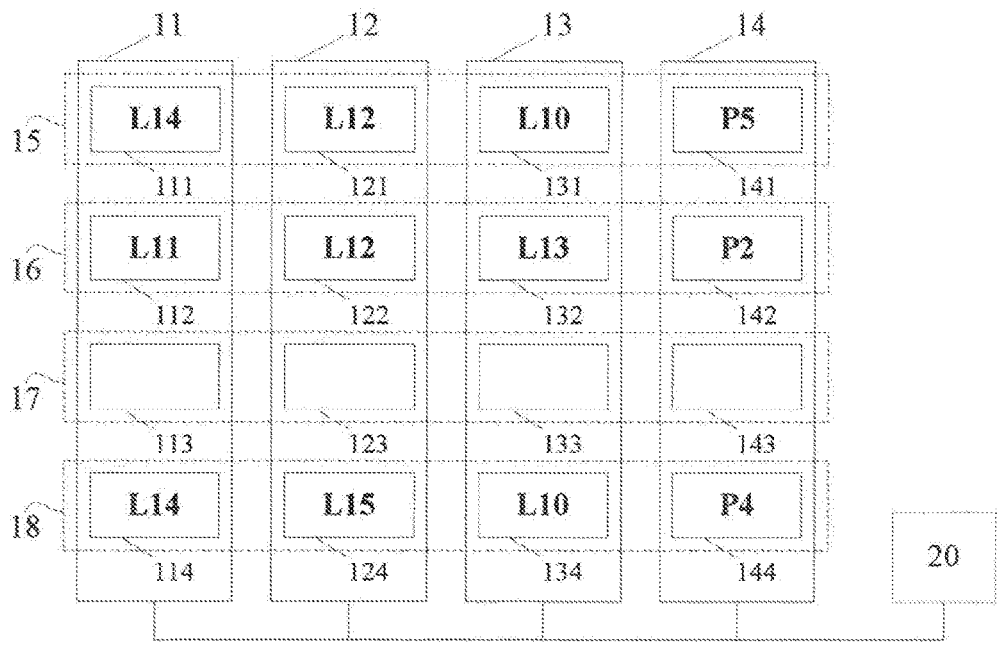
FIG. 6 is a schematic block diagram of the first logic page numbers and second logic page numbers of the first embodiment of the redundant disk array system in FIG. 1 being stored in the data stripes 15, 16, and 18.

Two embodiments are used below for description. FIG. 3 to FIG. 5 are respectively schematic block diagrams of first logic page numbers of a first embodiment of the redundant disk array system in FIG. 1 being stored in the data stripes 15 to 18. FIG. 6 is a schematic block diagram of the first logic page numbers and second logic page numbers of the first embodiment of the redundant disk array system in FIG. 1 being stored in the data stripes 15 to 18. Referring to FIG. 3 to FIG. 6, in the first embodiment, a hard disk where each first logic page number can be stored is fixed, and a designated disk where each first logic page number can be stored may be determined by means of a remainder operation of a mathematical operation or a table lookup method. That is, the processing unit 20 writes the first logic page numbers into the write pages of a designated disk of the disks 11 to 14 traversed by the data stripes 15 to 18. For example, the first logic page numbers corresponding to multiple pieces of write data are "L10", "L11", "L12", "L13", "L14", and "L15". It is assumed that a designated disk where the first logic page numbers "L14" and "L11" can be stored is the disk 11, a designated disk where the first logic page numbers "L12" and "L15" can be stored is the disk 12, and a designated disk where the first logic page numbers "L13" and "L10" can be stored is the disk 13. If a sequence in which the processing unit 20 receives the first logic page numbers is "L14", "L11", "L12", "L15", "L13", and "L10", because the processing unit 20 is required to select a data stripe arbitrarily, as shown in FIG. 3, after selecting the data stripe 17, the processing unit 20 stores the first logic page number "L14" into a page, that is, the write page 113, of the disk 11. Moreover, because the designated disk where the first logic page number "L11" can be stored is the disk 11, in this case, the processing unit 20 does not select the data stripe 17 and instead selects the other data stripes 15, 16, and 18. For example, the processing unit 20 selects the data stripe 15, and the processing unit 20 stores "L11" into a page, that is, the write page 111, of the disk 11 traversed by the data stripe 15.

Next, because the designated disk where the first logic page number "L12" can be stored is the disk 12, the processing unit 20 may select to store L12 in a page (that is, the write page 123), continuous with the write page 113, in the data stripe 17, to continuously write L12 into the data stripe 17 to fill the write pages traversed by the data stripe 17. Alternatively, in some other implementation aspects, the processing unit 20 may also select to store the first logic page number "L12" in a page (that is, the write page 121), continuous with the write page 111, in the data stripe 15, to continuously write L12 into the data stripe 15. After the processing unit 20 stores the first logic page number "L12" into the write page 123, the processing unit 20 stores the first logic page number "L15" into a page (that is, the write page 121), continuous with the write page 111, in the data stripe 15, to continuously write L15 into the data stripe 15. Eventually, the processing unit 20 selects to store the first logic page number "L13" into the write page 131, to continuously write L13 into the data stripe 15 to fill the write pages 111, 121, and 131 traversed by the data stripe 15, and to store the first logic page number "L10" into the write page 133 to continuously write L10 into the data stripe 17 to fill the write pages 113, 123, and 133 traversed by the data stripe 17.

In another aspect, to calculate a parity bit of each data stripe, the processing unit 20 records a write location of each first logic page number (Step S07). For example, FIG. 3 is used as an example, and the processing unit 20 records that write locations of the first logic page numbers "L11", "L15", and "L13" are respectively the write pages 111, 121, and 131, and the processing unit 20 records that write locations of the first logic page numbers "L14", "L12", and "L10" are respectively the write pages 113, 123, and 133. Therefore, the processing unit 20 reads the write pages 111, 121, and 131 to obtain the first logic page numbers "L11", "L15", and "L13" to obtain through calculation that a parity bit of the data stripe 15 is "P1", and the processing unit 20 reads the write pages 113, 123, and 133 to obtain the first logic page numbers "L14", "L12", and "L10" to obtain through calculation that a parity bit of the data stripe 17 is "P3". The processing unit 20 respectively stores "P1" and "P3" into the write pages 141 and 143. In some implementation aspects, the processing unit 20 may record write locations of the first logic page numbers into a memory or another storage unit, which has a storage capability, included in the processing unit 20.

As shown in FIG. 4, in some embodiments, if the write data corresponding to the first logic page number "L11" is updated, the processing unit 20 repeatedly receives the first logic page number "L11". Because the designated disk where the first logic page number "L11" can be stored is the disk 11, in this case, the processing unit 20 is required to select the data stripe 16 or the data stripe 18. For example, the processing unit 20 selects the data stripe 16, and the processing unit 20 stores the first logic page number "L11" into a page, that is, the write page 112, of the disk 11 traversed by the data stripe 16.

After the processing unit 20 stores the first logic page number "L11" into the write page 112, if the pieces of write data corresponding to the first logic page numbers "L14", "L15", "L10", "L12", and "L13" are sequentially updated, the processing unit 20 sequentially receives repeated first logic page numbers "L14", "L15", "L10", "L12", and "L13". The processing unit 20 stores the first logic page number "L14" into a page, that is, the write page 114, of the disk 11 traversed by the data stripe 18, and the processing unit 20 stores the first logic page number "L15" into a page, that is, the write page 122 or the write page 124, of the disk 12 traversed by the data stripe 16 or the data stripe 18, to continuously write the data stripe 16 or the data stripe 18. In FIG. 4, for example, the processing unit 20 selects the data stripe 18 and stores the first logic page number "L15" into the write page 124. Moreover, the processing unit 20 stores the first logic page number "L10" into a page, that is, the write page 134 continuous with the write page 124, of the disk 13 traversed by the data stripe 18, to select to preferentially fill the data stripe 18. Eventually, the processing unit 20 stores the first logic page numbers "L12" and "L13" into pages, that is, the continuous write pages 122 and 132, of the disks 12 and 13 traversed by the data stripe 16.

another aspect, to calculate parity bits of the data stripes 16 and 18, the processing unit 20 needs to update write locations of the first logic page numbers, that is, the processing unit 20 respectively updates write locations of the first logic page numbers "L11", "L12", "L13", "L14", "L15", and "L10" to the write pages 112, 122, 132, 114, 124, and 134. Based on this, the processing unit 20 reads the write pages 112, 122, and 132, to obtain through calculation that a parity bit of the data stripe 16 is "P2", and reads the write pages 114, 124, and 134 to obtain through calculation that a parity bit of the data stripe 18 is "P4". The processing unit 20 respectively stores the parity bits "P2" and "P4" into the write pages 142 and 144.

Further, after the processing unit 20 updates multiple first logic page numbers, one of first logic page numbers that is stored first corresponds to old write data. For example, in FIG. 3, the first logic page numbers where the data stripes 15 and 16 are stored include multiple invalid page numbers. A quantity of invalid page numbers in the data stripe 15 is 3, and the invalid first logic page numbers are "L11", "L15", and "L13". A quantity of invalid page numbers in the data stripe 16 is 0. A quantity of invalid page numbers in the data stripe 17 is 3, and the invalid first logic page numbers are "L14", "L12", and "L10". A quantity of invalid page numbers in the data stripe 18 is 0. In another aspect, the processing unit 20 determines in real time whether garbage collection needs to be performed (Step S03). When storage space of the disks 11 to 14 is less than a threshold (or reaches a set condition for executing garbage collection), for example, storage space of the disks 11 to 14 has 20% left, or storage space of the disks 11 to 14 has only reserved space, in this case, a determining result in Step S03 is "yes", the processing unit 20 starts to execute garbage collection (Step S04), to release write pages, that is, the write pages 111, 121, 131, 113, 123, and 133, in which invalid page numbers are stored. FIG. 5 is a schematic diagram of releasing invalid page numbers after the processing unit 20 executes garbage collection. In some implementation aspects, if a determining result in Step S03 is "no", the processing unit 20 repeatedly executes Step S02 to sequentially and continuously store first logic page numbers in the write pages.

After Step S04 is executed, if a plurality of pieces of data sent by the output/input apparatus respectively corresponds to multiple second logic page numbers, in this case, the processing unit 20 stores the second logic page numbers into blank pages of write pages traversed by the data stripes 15 to 18. In this embodiment, a disk where each second logic page number can be stored is also fixed, that is, the processing unit 20 writes the second logic page numbers into write pages of a designated disk of the disks 11 to 14 traversed by the data stripes 15 to 18. In this case, the processing unit 20 may select a data stripe of the data stripes 15 to 18 that has the most invalid page numbers to store the second logic page numbers (Step S05). For example, in FIG. 4, the data stripes 15 and 17 have the largest quantity of invalid page numbers, and the processing unit 20 preferentially selects the data stripe 15 or the data stripe 17 to store the second logic page numbers. For example, the processing unit 20 selects the data stripe 15 and the second logic page numbers are sequentially "L14", "L12", and "L10". As shown in FIG. 6, the processing unit 20 stores the second logic page numbers "L14", "L12", and "L10" sequentially and continuously into the write pages 111, 121, and 131 traversed by the data stripe 15. In some implementation aspects, the second logic page numbers may also be non-repetitive logic page numbers, for example, "L16", "L19", and "L107", but the present invention is not limited thereto.

Similarly, after Step S04 is executed, to calculate the parity bit of the data stripe 15 again, the processing unit 20 also records a write location of each second logic page number (Step S06). As shown in FIG. 6, the processing unit 20 records that write locations of the second logic page numbers "L14", "L12", and "L10" are the write pages 111, 121, and 131. Based on this, the processing unit 20 reads the write pages 111, 121, and 131 and then obtains through calculation that the parity bit of the data stripe 15 is "P5", and then stores "P5" into the write page 141.

In some implementation aspects, states of the first logic page numbers and the second logic page numbers being valid or invalid are recorded in the disks 11 to 14. For example, a designated disk where the first logic page numbers "L14" and "L11" in the foregoing can be stored is the disk 11, a designated disk where the first logic page numbers "L12" and "L15" can be stored is the disk 12, and a designated disk where the first logic page numbers "L13" and "L10" can be stored is the disk 13. In the example, the disk 11 records that states of the first logic page numbers "L14" and "L11" are valid or invalid, the disk 12 records that states of the first logic page numbers "L12" and "L15" are valid or invalid, and the disk 13 records that states of the first logic page numbers "L13" and "L10" are valid or invalid. Based on this, when garbage collection is executed, the processing unit 20 may perform a poll on each disk to obtain quantities of invalid page numberslq the data stripes 15 to 18. For example, in FIG. 4, after the processing unit 20 performs a poll on the disk 11, it may be known that the quantities of invalid page numbers in the data stripes 15 to 18 are respectively 1, 0, 1, and 0, and after the processing unit 20 performs a poll on the disks 12aa 13, it may be known that the quantities of invalid page numbers in the data stripes 15 and 17 are increased from 1 to 3. The data stripes 16 and 18 do not have an invalid page number.

Figure 7:
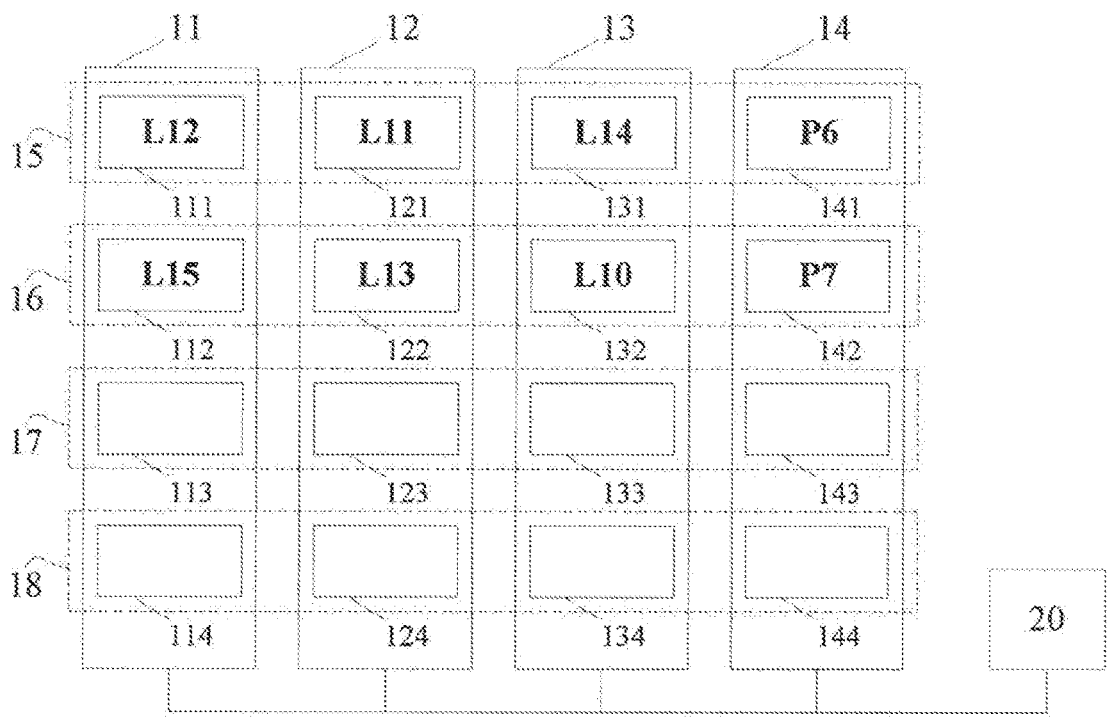
FIG. 7 is a schematic block diagram of first logic page numbers of a second embodiment of the redundant disk array system in FIG. 1 being stored in data stripes 15 and 16.
Figure 8:
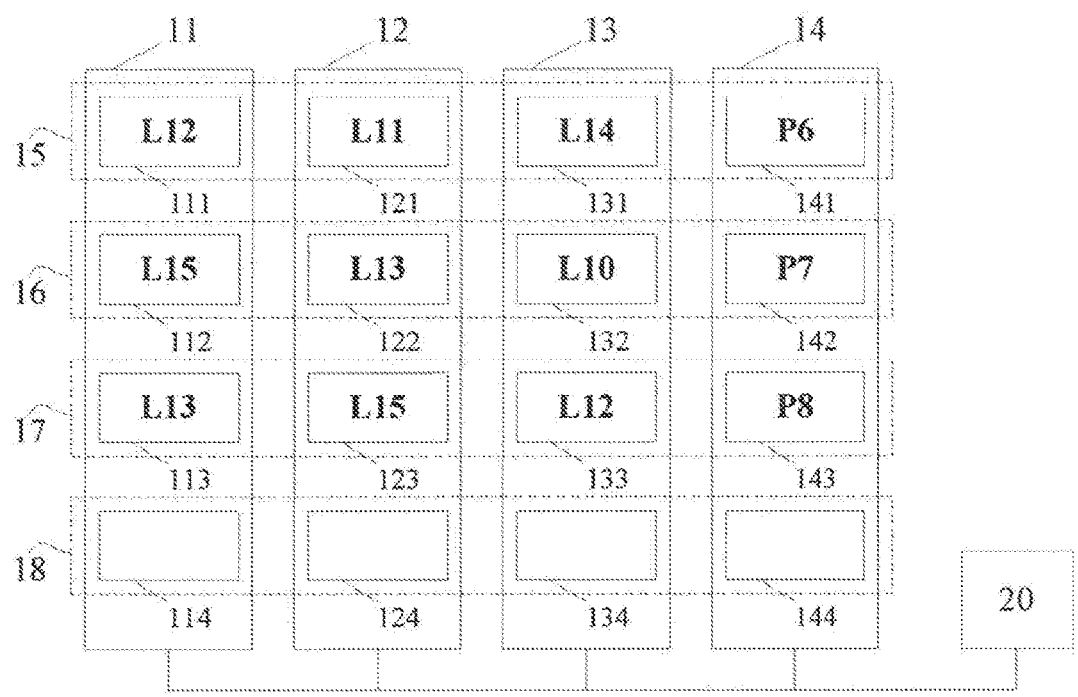
FIG. 8 is a schematic block diagram of the first logic page numbers of the second embodiment of the redundant disk array system in FIG. 1 being stored in data stripes 15 and 17.
Figure 9:
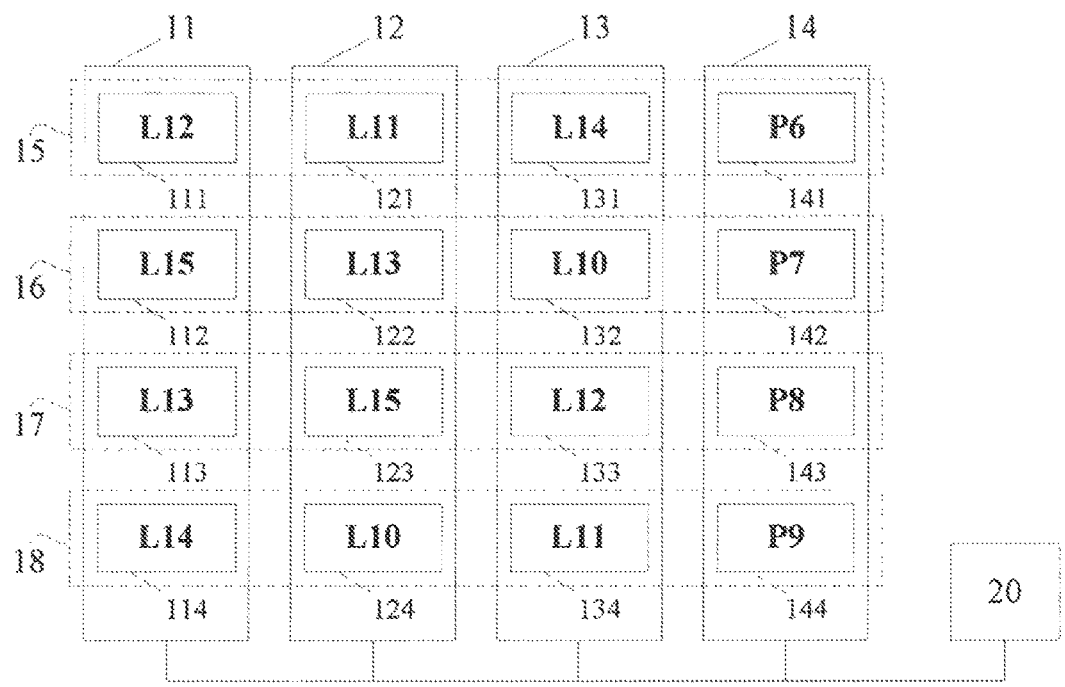
FIG. 9 is a schematic block diagram of the first logic page numbers of the second embodiment of the redundant disk array system in FIG. 1 being stored in data stripes 15 to 18.
Figure 10:
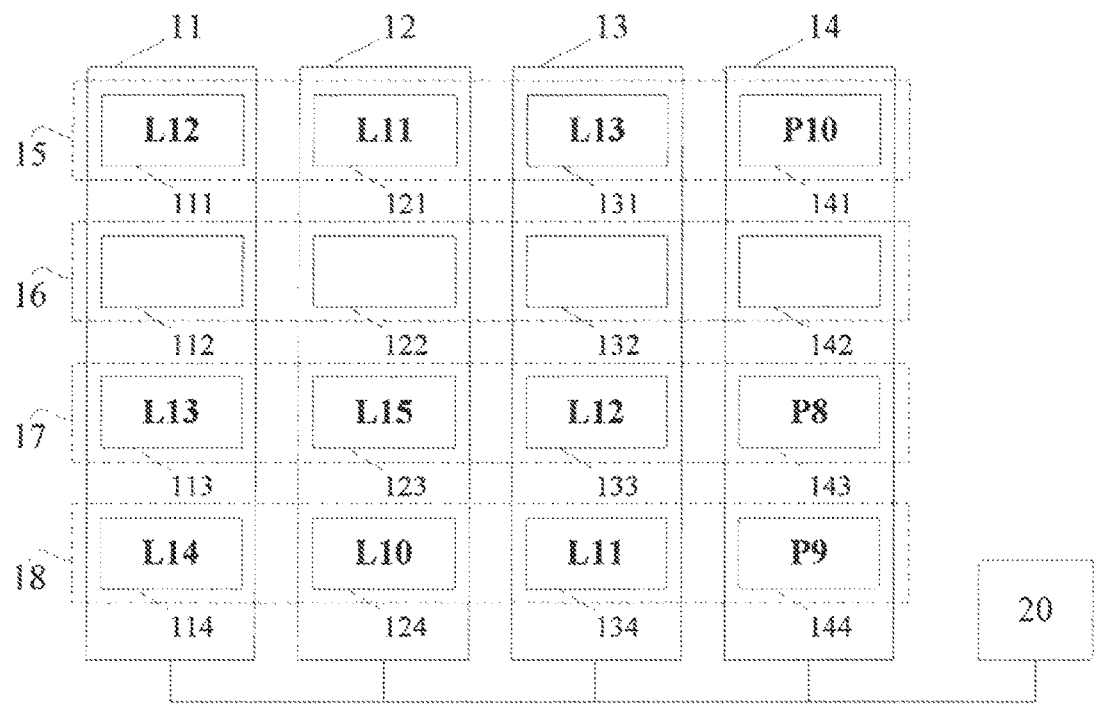
FIG. 10 is a schematic block diagram of the first logic page numbers and second logic page numbers of the second embodiment of the redundant disk array system in FIG. 1 being stored in the data stripes 15, 17, and 18.

FIG. 7 to FIG. 9 are respectively schematic block diagrams of first logic page numbers of a second embodiment of the redundant disk array system in FIG. 1 being stored in the data stripes 15 to 18. FIG. 10 is a schematic block diagram of the first logic page numbers and the second logic page numbers of the second embodiment of the redundant disk array system in FIG. 1 being stored in the data stripes 15 to 18. Referring to FIG. 7 to FIG. 10, in the second embodiment, the first logic page numbers and the second logic page numbers may be stored into any disk. That is, even if same first logic page numbers or same second logic page numbers are sequentially received, the processing unit 20 may select any disk of the disks 11 to 14 traversed by the data stripes 15 to 18, and write the first logic page numbers and the second logic page numbers in the write pages of any disk. As shown in FIG. 7, for example, the first logic page numbers sequentially received by the processing unit 20 during execution of Step S02 are "L12", "L11", "L14", "L15", "L13", and "L10". In the example, the processing unit 20 may select to store the first logic page number "L12" into the disks 11 to 14 traversed by the data stripes 15 to 18. For example, the data stripe 15 is selected. The processing unit 20 stores the first logic page number "L12" into a page, that is, the write page 111, of the disk 11 traversed by the data stripe 15. Next, the processing unit 20 may write the first logic page numbers "L11" and "L14" into continuous write pages 121 and 131 in the data stripe 15, to select to preferentially fill the continuous write pages 111, 121, and 131 traversed by the data stripe 15. Alternatively, in some other implementation aspects, the processing unit 20 may also write the first logic page numbers "L11" and "L14" into the data stripes 16, 17, and 18. Eventually, the processing unit 20 selects to store "L15", "L13", and "L10" into the data stripe 16 to select to preferentially fill the continuous write pages 112, 122, and 132 traversed by the data stripe 16.

In the second embodiment, the processing unit 20 also records write locations of the first logic page numbers and the second logic page numbers to calculate a parity bit of each data stripe, which is described in detail in the first embodiment, and is no longer elaborated herein. The processing unit 20 obtains through calculation that the parity bits of the data stripes 15 and 16 are respectively "P6" and "P7" and then stores "P6" and "P7" into the write pages 141 and 142.

Moreover, as shown in FIG. 8, if multiple pieces of write data sequentially received by the processing unit 20 correspond to repeated first logic page numbers. For example, the first logic page numbers are sequentially "L13", "L15", and "L12". In this case, the processing unit 20 may store the first logic page number "L13" into the data stripe 17 or the data stripe 18. For example, the processing unit 20 selects the data stripe 17. The processing unit 20 stores the first logic page number "L13" into a page, that is, the write page 113, of the disk 11 traversed by the data stripe 17, and the processing unit 20 writes the first logic page number "L15" into the write page 123, continuous with the write page 113, in the data stripe 17, and writes the first logic page number "L12" into the write page 133, continuous with the write page 123, in the data stripe 17, to select to preferentially fill the data stripe 17. In another aspect, the processing unit 20 calculates that a parity bit of the data stripe 17 is "P8" and then stores "P8" in the write page 143.

As can be seen from FIG. 8, a logic page number of the multiple first logic page numbers is stored in different disks at sequential time points. The first logic page number "L13" is used as example. At an earlier first time point, the first logic page number "L13" is stored in the write page 122 in the disk 12. In this case, a state of the write page 122 stored in the disk 12 is valid, and at a later second time point, the processing unit 20 stores the first logic page number "L13" into another write page 113 that is located in a different disk (the disk 11) from the write page 122. Therefore, the processing unit 20 sends a signal to control the disk 12, to update the state, of the write page 122, stored in the disk 12 from being valid to being invalid and to update the quantities of invalid page numbers in the data stripes 15 to 18.

Further, after the processing unit 20 updates multiple first logic page numbers (the first logic page numbers "L14", "L10", and "L11" are respectively updated in the write pages 114, 124, and 134, and a parity bit of the data stripe 18 is "P9"), as shown in FIG. 9, the disks 11 to 13 traversed by the data stripes 15 and 16 include multiple invalid page numbers. If in this case, storage space of the disks 11 to 14 is less than a threshold (or reaches a set condition for executing garbage collection), the processing unit 20 executes garbage collection (Step S04) to release write pages, that is, the write pages 111, 121, 131, 112, 122, and 132, in which invalid page numbers are stored. In the second embodiment, the processing unit may also perform a poll on each disk to obtain the quantities of invalid page numbers in the data stripes 15 to 18.

After Step S04 is executed, multiple pieces of write data received by the processing unit 20 correspond to the second logic page numbers. In this case, the processing unit 20 continues to execute Step S05, so as to select, according to quantities of invalid page numbers in the data stripes 15 to 18, a data stripe having the most invalid page numbers. For example, in FIG. 9, a quantity of invalid page numbers in the data stripe 15 is 3, a quantity of invalid page numbers in the data stripe 16 is 3, a quantity of invalid page numbers in the data stripe 17 is 0, and a quantity of invalid page numbers in the data stripe 18 is 0. In this case, the processing unit 20 selects the data stripe 15 or the data stripe 16 to store the second logic page numbers. For example, the data stripe 15 is selected and the second logic page numbers are sequentially "L12", "L11", and "L13". In the example, as shown in FIG. 10, the processing unit 20 sequentially stores the second logic page numbers "L12", "L11", and "L13" in the data stripe 15, to select to preferentially fill the write pages 111, 121, and 131 traversed by the data stripe 15. In another aspect, the processing unit 20 obtains through calculation that a parity bit of the data stripe 15 is "P10" and then stores "P10" into the write page 141.

In this embodiment, because same ones of the first logic page numbers and same ones of the second logic page numbers may be stored into different disks, the processing unit 20 records disk storage locations of each first logic page number and each second logic page number. Here, it is designed that each of the disks 11 to 14 corresponds to an index value (for ease of description, referred to as a first index value below). The first index value may be represented by a plurality of bits, and a quantity of the bits corresponds to a quantity of disks. For example, there are four disks 11 to 14, and the first index value may be represented by 2 bits, that is, bits "00", "01", "10", and "11" respectively represent the disks 11 to 14. If the quantity of disks is 20, the first index value may be represented by 5 bits. If the quantity of disks is 256, the first index value may be represented by 8 bit, and the rest is deduced there accordingly and is no longer elaborated. Moreover, it is designed that each first logic page number corresponds to another index value (referred to as a second index value below), and it is designed that each second logic page number corresponds to the second index value, that is, the first logic page numbers and the second logic page numbers may both correspond to the second index value. The processing unit 20 records corresponding relationships between the first index values corresponding to the disks 11 to 14 storing the first logic page numbers and the second index values corresponding to the first logic page numbers (that is, the disk storage locations of the first logic page numbers). Moreover, the processing unit 20 records corresponding relationships between the first index values corresponding to the disks 11 to 14 storing the second logic page numbers and the second index values corresponding to the second logic page numbers (that is, the disk storage locations of the second logic page numbers). In some implementation aspects, the first logic page numbers and the second logic page numbers stored in the disks 11 to 14 may be the second index values formed of a plurality of bits. In some implementation aspects, quantities of bits of the second index values correspond to the quantities of the first logic page numbers and the second logic page numbers.

Referring to FIG. 7 to FIG. 10 again, in which the tables respectively present the corresponding relationships between the first index values and the second index values between, to respectively represent the corresponding relationships between the disks 11 to 14 in the example in FIG. 7 to FIG. 10 and disk storage locations of the first logic page numbers and the second logic page numbers. It is assumed that first index values respectively corresponding to the disks 11 to 14 are "00", "01", "10", and "11", and second index values corresponding to the first logic page numbers "L10", "L11", "L12", "L13", "L14", and "L15" are respectively "000", "001", "010", "011", "100", and "101". For example, in FIG. 7, the first logic page numbers "L12" and "L15" are stored in the disk 11, the first logic page numbers "L11" and "L13" are stored in the disk 12, and the first logic page numbers "L14" and "L10" are stored in the disk 13. Therefore, the processing unit 20 records a corresponding relationship between the bit "00" and the bits "010" and "101", a corresponding relationship between the bit "01" and the bits "001" and "011", and a corresponding relationship between the bit "10" and the bits "100" and "000". The corresponding relationships between the first index values and the second index values shown in FIG. 8 to FIG. 10 are deduced there accordingly, and are no longer elaborated.

In practice, the processing unit 20 may be implemented by using a microcontroller, a microprocessor, a central processing unit or an application-specific integrated circuit (ASIC). Moreover, the processing unit 20 may record the corresponding relationships between the first index values and the second index values into a storage apparatus having a data storage capability, and this storage apparatus may be a part of the processing unit 20 or another additionally disposed storage apparatus.

In conclusion, according to an embodiment of the redundant disk array system of the present invention, a logic page number may be stored into any data stripe, and a data stripe having the largest quantity of invalid page numbers may be preferentially selected to store the logic page number; moreover, a corresponding relationship between the logic page number and a disk storage location of the logic page number is further stored by recording an index value; in this way, not only use efficiency of blank write pages traversed by a data stripe is improved, but also a memory capacity needed in the use of a log manner is significantly reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A redundant disk array system for improving use efficiency of write pages of the redundant disk array traversed by a data stripe, the redundant disk array system comprising:
    a plurality of disks, each disk comprising multiple memory pages;
    a plurality of data stripes, each data stripe traversing multiple write pages of the memory pages of each disk, and the write pages being used to store multiple pieces of write data and a parity bit corresponding to the pieces of write data, wherein each piece of write data corresponds to a first logic page number; and
    a processing unit, configured to write the first logic page numbers into the write pages of the plurality of disks sequentially and continuously according to a sequence of the write pages in each data stripe, wherein the processing unit records a write location of each first logic page number to calculate the parity bit, the first logic page numbers comprise at least one invalid page number, and the processing unit performs garbage collection on the at least one invalid page number, wherein
    after the processing unit executes garbage collection, the processing unit writes to the plurality of disks a plurality of second logic page numbers corresponding to the pieces of write data sequentially and continuously into the write pages traversed by a data stripe of the data stripes that has the most invalid page numbers, and the processing unit records a write location of each second logic page number to calculate the parity bit.

2. The redundant disk array system according to claim 1, wherein the processing unit writes the first logic page numbers and the second logic page numbers into the write pages of a designated disk of the disks traversed by the data stripes.

3. The redundant disk array system according to claim 1, wherein the processing unit writes the first logic page numbers and the second logic page numbers into the write pages of any disk of the disks traversed by the data stripes.

4. The redundant disk array system according to claim 3, wherein each disk corresponds to a first index value, the first index value is represented by a plurality of bits, a quantity of the bits corresponds to a quantity of the disks, each first logic page number and each second logic page number correspond to a second index value respectively, and the processing unit records corresponding relationships between the first index values of the disks storing the first logic page numbers and the second index values, and records corresponding relationships between the first index values of the disks storing the second logic page numbers and the second index values.

5. The redundant disk array system according to claim 3, wherein a logic page number of the first logic page numbers is stored into a first write page of the write pages at a first time point, and the processing unit writes the logic page number into a second write page of the write pages at a second time point, so that a state of the first write page is updated from being valid to being invalid, wherein the first write page and the second write page are located in different disks of the disks.

6. A data storage method, executed on a redundant disk array, for improving use efficiency of write pages of the redundant disk array traversed by a data stripe, the redundant disk array comprising a plurality of disks, each disk comprising multiple memory pages, and the data storage method comprising:
    establishing a plurality of data stripes, each data stripe traversing multiple write pages of the pages of each disk, and the write pages being used to store multiple pieces of write data and a parity bit corresponding to the pieces of write data, wherein each piece of write data corresponds to a first logic page number;
    writing to a disk the first logic page numbers into the write pages sequentially and continuously according to a sequence of the write pages in each data stripe, the first logic page numbers comprising at least one invalid page number;
    recording a write location of each first logic page number to calculate the parity bit;
    performing garbage collection on the at least one invalid page number;
    writing to a disk a plurality of second logic page numbers corresponding to the pieces of write data sequentially and continuously into the write pages traversed by a data stripe of the data stripes that has the most invalid page numbers; and
    recording a write location of each second logic page number to calculate the parity bit.

7. The data storage method according to claim 6, wherein the step of writing the first logic page numbers into the write pages sequentially and continuously and the step of writing second logic page numbers sequentially and continuously into the data stripes are: writing the first logic page numbers and the second logic page numbers into the write pages of a designated disk of the disks traversed by the data stripes.

8. The data storage method according to claim 6, wherein the step of writing the first logic page numbers into the write pages sequentially and continuously and the step of writing second logic page numbers sequentially and continuously into the data stripes are: writing the first logic page numbers and the second logic page numbers into the write pages of any disk of the disks traversed by the data stripes.

9. The data storage method according to claim 8, wherein the step of writing the first logic page numbers and the second logic page numbers into any disk of the disks traversed by the data stripes comprises:
    establishing a first index value corresponding to each disk, the first index value being represented by a plurality of bits, and a quantity of the bits corresponding to a quantity of the disks;
    establishing a second index value corresponding to each first logic page number;
    establishing a second index value corresponding to each second logic page number;
    recording corresponding relationships between the first index values corresponding to the disks storing the first logic page numbers and the second index values; and
    recording corresponding relationships between the first index values corresponding to the disks storing the second logic page numbers and the second index values.

10. The data storage method according to claim 6, wherein the step of writing the first logic page numbers into the write pages sequentially and continuously comprises:
    writing a logic page number of the first logic page numbers into a first write page of the write pages at a first time point;
    recording that a state of the first write page is valid;
    writing the logic page number into a second write page of the write pages at a second time point, the second write page and the first write page being located in different disks of the disks; and
    updating the state of the first write page to being invalid.

* * * * *